US007000226B2

(12) United States Patent
Gao et al.

(10) Patent No.: US 7,000,226 B2
(45) Date of Patent: Feb. 14, 2006

(54) EXCEPTION MASKING IN BINARY TRANSLATION

(75) Inventors: Baiming Gao, Shanghai (CN); Yun Wang, Shanghai (CN); Yigal Zemach, Rehovot (IL); Orna Etzion, Haifa (IL); Jianhui Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 10/038,139

(22) Filed: Jan. 2, 2002

(65) Prior Publication Data

US 2003/0126419 A1    Jul. 3, 2003

(51) Int. Cl.
*G06F 9/45* (2006.01)
(52) U.S. Cl. .................... 717/136; 717/151; 703/26
(58) Field of Classification Search ........ 717/136–138, 717/140, 151; 712/244; 703/26, 27
See application file for complete search history.

(56) References Cited

U.S. PATENT DOCUMENTS

| 5,507,030 | A | * | 4/1996 | Sites ........................ 717/136 |
| 5,664,134 | A | * | 9/1997 | Gallup et al. ............... 712/245 |
| 6,006,245 | A | * | 12/1999 | Thayer ....................... 708/404 |
| 6,173,248 | B1 | * | 1/2001 | Brauch ....................... 703/26 |
| 6,314,560 | B1 | * | 11/2001 | Dunn et al. ................. 717/153 |
| 6,502,237 | B1 | * | 12/2002 | Yates et al. ................. 717/136 |
| 6,681,322 | B1 | * | 1/2004 | Safford et al. ............... 712/244 |
| 6,728,950 | B1 | * | 4/2004 | Davis et al. ................. 717/136 |
| 6,732,220 | B1 | * | 5/2004 | Babaian et al. ................ 711/6 |
| 6,760,904 | B1 | * | 7/2004 | Jennion et al. ............. 717/137 |
| 6,817,012 | B1 | * | 11/2004 | Zammit et al. ............. 717/136 |
| 6,871,173 | B1 | * | 3/2005 | Brauch ....................... 703/26 |

OTHER PUBLICATIONS

Silberman et al., "An architectural framework for migration from CISC to higer performance platform"m ACM ICS, pp 198-215, 1992.*
Sanz et al, "Computing multi colored polygonal mask in pipeline architectures and its application automated visual inspection", Comm. of the ACM, vol. 30, No. 4, pp 318-329, 1987.*
Gschwind et al, "Binary trasnlation and architecture convergence issues for IBM system/390", ACM ICS, pp 336347, 2000.*
Sites et al, "Binary translation", Comm. of the ACM, vol. 36, No. 3, pp 69-81, Feb. 1993.*

* cited by examiner

*Primary Examiner*—Anil Khatri
(74) *Attorney, Agent, or Firm*—Blakely, Sokoloff, Taylor & Zafman LLP (57) ABSTRACT

Mapping of exception masks between source and target architectures with different numbers of exception masks enables a binary translator to translate code from the source to the target architecture and to determine an appropriate state for the source architecture if an exception is raised when executing the translated code.

27 Claims, 7 Drawing Sheets

Figure 6

EXCEPTION MASKING IN BINARY TRANSLATION

FIELD OF THE INVENTION

This invention relates generally to translation of binary code, and more particularly to masking exceptions in translated code.

BACKGROUND OF THE INVENTION

Binary translators translate object program code between different computer architectures to enable a program written for a source architecture to be executed on a target architecture. In addition to other concerns, the binary translator should provide for accurate exception handling in the translated code, which may be difficult when the source and target architectures have different execution models. For example, the source architecture may contain multiple distinct exception masks while the target architecture supplies a single equivalent mask for the exception, such as when the source architecture supports multiple floating point function units, while the target architecture only supports a single floating point function unit.

The performance of the translated code may be greatly degraded if instructions that use different exception masks are mixed. Performance may be further degraded by the need to schedule faulty instructions in strict order so that the state of the source architecture can be correctly restored when an exception occurs.

Furthermore, given the difference between the execution models, one instruction in the source architecture is often translated to several instructions in target architecture, which may lead to an inconsistency in the state of the source architecture when an exception occurs during the execution of the corresponding translated instructions in the target architecture.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

A binary translator in accordance with the present invention is described in terms of floating point (FP) numeric exceptions in which the source architecture utilizes two FP modes and the target architecture utilizes a single FP mode. Particular examples are based on the Intel IA32 architecture as the source architecture and the Intel IA64 architecture as the target architecture. The IA32 architecture has two floating point modes, FP stack and Streaming SIMD Extension (SSE), while the IA64 has only a single FP mode. It will be appreciated that the present invention is not limited by the terms of the description or the examples. In particular, the invention is applicable to binary translators in which any dissimilar number of exception masks are used by the source and target architectures, and in which exceptions other than floating point numeric exceptions are masked.

Figure 1:
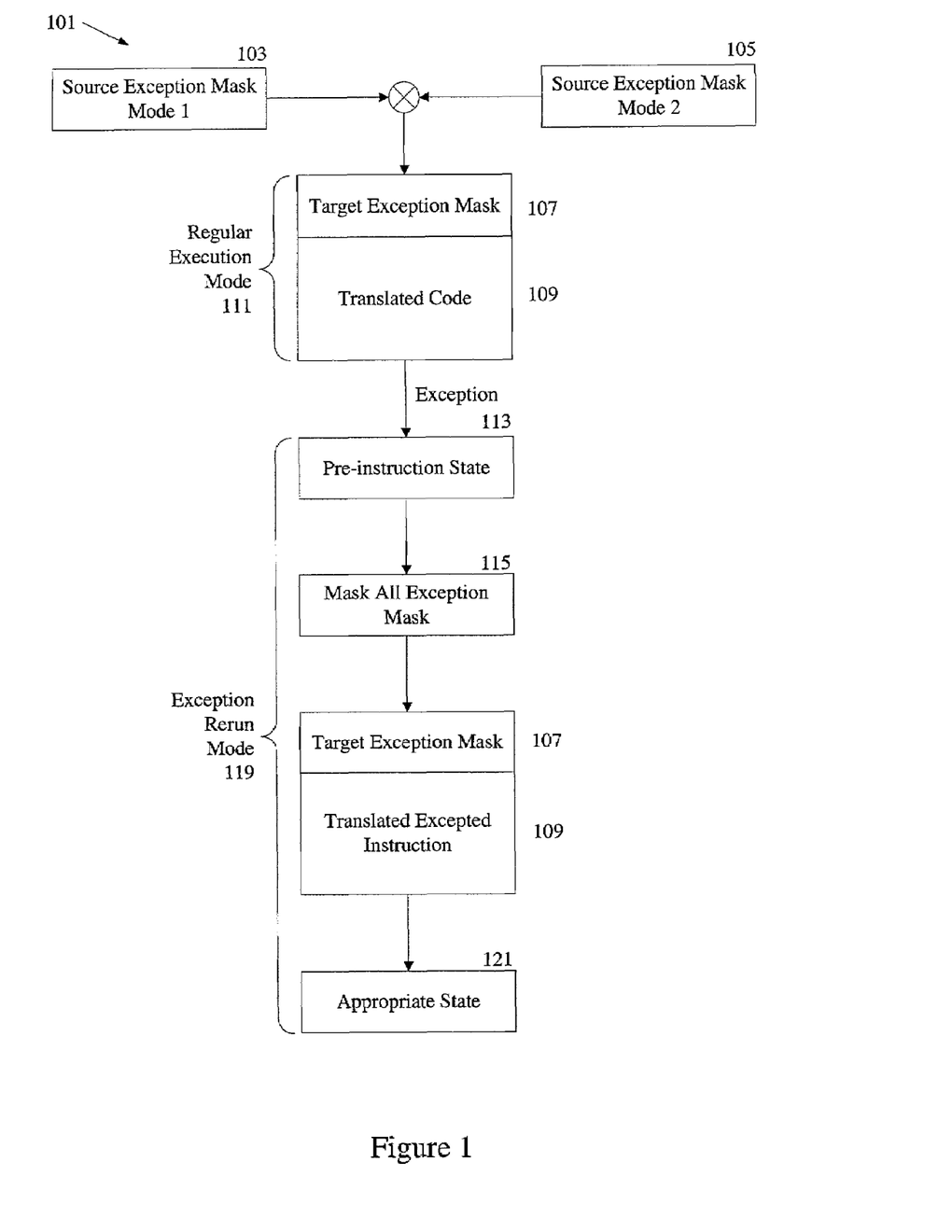
FIG. 1 is a diagram illustrating the operation of one embodiment of the invention.

The operation of one embodiment of a binary translator according to the invention is described by reference to FIG. 1. As part of the process of translating code from a source to a target architecture, the binary translator 101 generates an instruction that maps multiple distinct exception masks 103, 105 in the source architecture into a single equivalent exception mask 107 in the target architecture. The code block 109 is executed in a "regular" execution mode 111. Assuming all exceptions are masked, or if no exceptions are raised, the regular execution mode execution completes and the binary translator 101 begins translating the next source code block.

When an exception is raised during execution, the exception handling for the binary translator 101 must ensure the state of the source architecture is correct. Generally, either the pre-instruction state (the state before the execution of the excepted source instruction) or the post-instruction state (the state after the execution of the excepted source instruction) is representative of the state of source architecture. However, because one instruction in the source architecture may be translated to several instructions in the target architecture, the atomic state update in the source architecture is non-atomically completed in the discrete translated instructions of the target architecture. Therefore, if one of the translated instructions raises an exception during execution, it may be unclear if the correct state of the source architecture state is the pre- or post-instruction state.

Additionally, the correct state depends on whether the exception is a genuine exception or an erroneous exception caused by the sharing of the target exception mask 107 by the source exception masks 103, 105. For example, the FP numeric exceptions of an IA32 FP instruction are masked by mask bits 401 of an FPCW register 400 illustrated in FIG. 4A, and the IA32 SSE instructions are masked by mask bits 411 of an MXCSR register 410 illustrated in FIG. 4B. In the IA65 architecture IA64, all FP exceptions are controlled by trap bits 421 a single FPSR register 420 illustrated in FIG. 4C. The binary translator 101 maps the fields 401 of the IA32 FPCW register 400 and fields 411 of the MXCSR register 410 into traps 421 in the IA64 FPSR register 420. In one embodiment, the IA64 FPSR trap bits 421 are set with the logical "AND" of the FPCW mask bits 401 and the MXCSR mask bits 411. Thus, the FPSR trap bits 421 are shared by the IA32 FP and SSE instructions, and therefore when an IA32 FP translated code block is executed, the translated code may raise an erroneous IA32 FP exception because FPCW masked the exception but MXCSR did not.

Figure 4A:
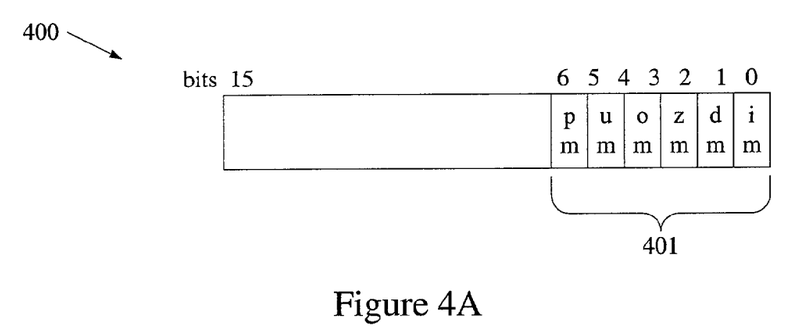
FIGS. 4A–C are diagrams of registers used in a particular embodiment of the invention.
Figure 4B:
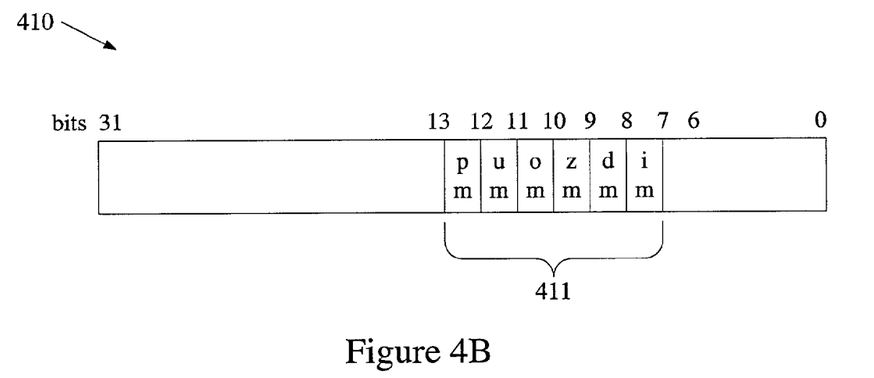
Figure 4C:
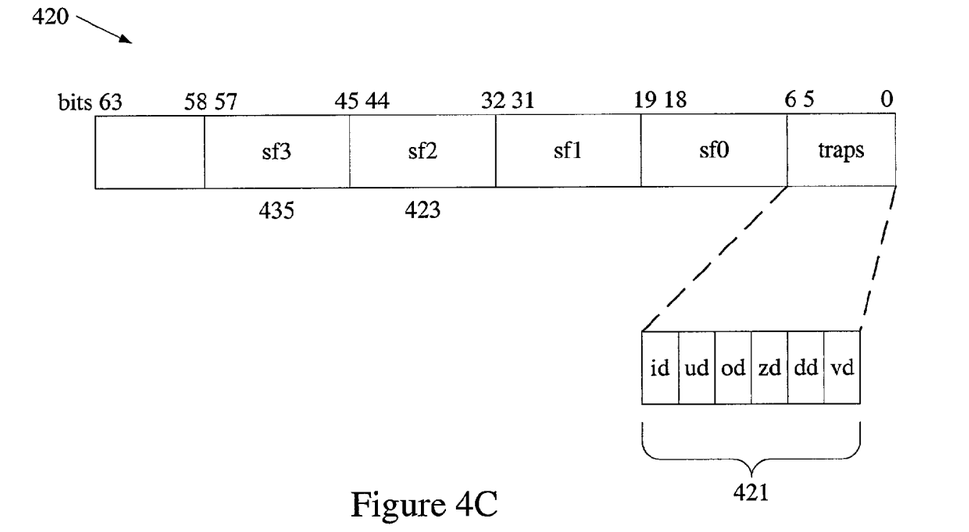

Similarly, there exist erroneous IA32 SSE exceptions. The exception flags for IA32 FP exceptions are mapped to status field 435 (sf3) of FPSR register 420 and exception flags for IA32 SSE exceptions are mapped to status field 423 (sf2).

To determine the correct state, the binary translator restores the state of the source architecture to the pre-instruction state 113, and re-translates and executes the excepted instruction in an "exception rerun" mode 119 that generates the state of source architecture. In the embodiment of the exception rerun mode illustrated in FIG. 1, the binary translator 101 generates an instruction that sets the target exception mask 107 to an exception mask 115 that prevents the generation of all exceptions so that all translated instructions will be executed, and the post-instruction state can be established.

After executing the translated instructions in the exception rerun mode, the binary translator 101 examines the result of the exception rerun mode execution to determine whether the original exception was genuine and whether the state of the source architecture 121 should be set to the preinstruction state or the post-instruction state. If the exception is erroneous, the correct state of the source architecture is the post-instruction state. If the exception is genuine, the correct state depends on the source mode and the particular exception raised.

For example, the single IA32 FP instruction Faddp adds ST(0) to ST(1), stores the result in ST(1), and pops the register stack. In IA64, this instruction is translated to the following instruction sequence:

Fadd ST(1), ST(0)//add ST(0) to ST(1) Add TOS, 1//TOS represents the top of the FP stack.

If a trap exception occurs in IA32 instruction Faddp, the ST(1) and TOS are both updated. However, if the exception is raised by the Fadd instruction in the IA64 translated code, the IA32 state is only half updated since TOS has not yet been increased. Therefore, the binary translator 101 reruns the Faddp instruction with all the exceptions masked to update TOS and obtain the post-instruction state by executing the following translated code:

Fldcw 0x3f;//mask all the exceptions

Fadd ST(1), ST(0)//add ST(0) to ST(1)

Add TOS, 1//TOS represents the top of the FP stack

In some instances, the post-instruction state for certain exceptions may be slightly different when all exceptions are masked than when the specific exceptions are unmasked. For example, the destination register for an underflow or overflow exception is different when the exceptions are masked than when they are not. Therefore, in one embodiment, the post-instruction state when the exception is raised is saved and used to modify the post-instruction state resulting from the exception rerun mode as necessary.

It will be appreciated that the embodiment of the exception rerun mode described above is not limited to use only with binary translators that incorporate the exception masking of the present invention but is also is suitable for handling exceptions in any type of binary translator.

In an alternate embodiment of the exception rerun mode that is not illustrated, the target exception mask is set to the source exception mask for the mode of the instruction so that only genuine exceptions will be raised when the instruction is re-executed. The post-instruction state obtained by re-executing the translated instructions is thus the correct state of the source architecture. The mode of the source instruction may be identified by decoding and examining the source instruction. One of skill in the art will readily conceive of further alternate embodiments that also generate the post-instruction state of the excepted instruction and such embodiments are considered within the scope of the present invention.

In general practice, certain exceptions, such as numeric FP exceptions, seldom occur in application programs and are commonly completely masked in the binary code so that no exceptions are generated during execution. Mapping the exception mask for each source mode individually to the single target exception mask prior to switching between modes requires saving and restoring the current mode's mask information, which is expensive in both cycles and code-size, and limits scheduling. Therefore, sharing the single exception mask in the target architecture when the exceptions are rare avoids the overhead and limitations associated with having to save and restore mask setting when switching between modes.

To ensure recovery to a consistent pre-instruction state of the source architecture when an exception occurs during translated code execution, the binary translator 101 maintains the mapping of the status/control registers of the source architecture in the translated code 109 until the successful completion of a translated instruction. Therefore, when an exception is raised in the translated instruction sequence, the pre-instruction state of the source architecture can be restored in the exception handler. Additionally, recovery to a consistent state requires that instructions that are non-reversible (such as store instructions) or that raise the exception must be scheduled in order. For example, if the Fadd and Add instructions described above were reversed in the translated code and an exception was raised by the Add instruction, the pre-instruction state could not be recovered since the TOS would already be updated. In contrast, when all exceptions are masked, the binary translator can schedule the translated code more freely.

Figure 2:
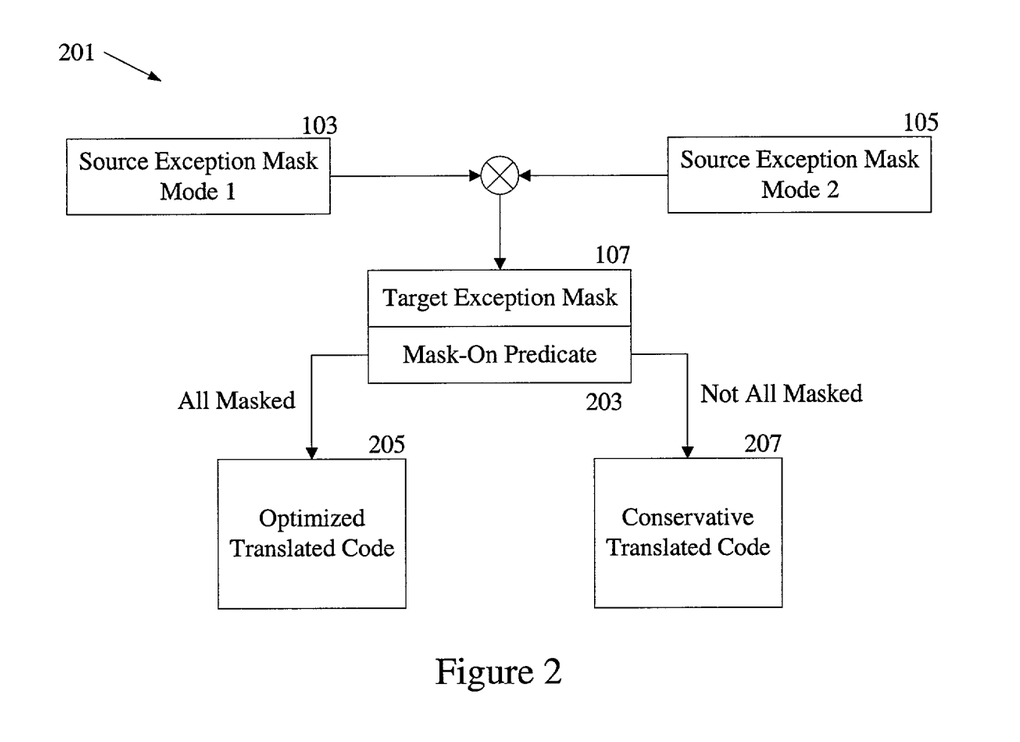
FIG. 2 is a diagram illustrating an alternate embodiment of the invention.

An alternate embodiment of the binary translator illustrated in FIG. 2 executes different translations of source code depending on the current exception mask. Two different translated code blocks are shown in the embodiment in FIG. 2, an optimized code block 205 for use when all exceptions are masked and a conservative code block 207 for use when some exceptions are unmasked; however, the invention is not so limited. Masking and un-masking of the exceptions can be performed dynamically through the execution of specific source architecture instructions (such as FUDCW in IA32 architecture). When these specific instructions are translated, the binary translator 201 inserts an instruction into the execution stream of the current code block to set or clear a mask-on predicate 203 accordingly. Each translated code block 205, 207 contains an instruction that checks the setting of the mask-on predicate 203 against the assumption of the default translated code block, e.g., optimized code block 205 assumes exceptions are masked. If the assumption is not met, the other code block is executed.

It will be appreciated that the optimization described above may be embodied in binary translators that do not incorporated the exception masking of the present invention.

Next, the particular methods performed by a processing unit to perform the embodiment described above in conjunction with FIGS. 1 and 2 are described with reference to flowcharts in FIGS. 3A and 3B, in which executable instructions are represented by blocks 303 until 315, and from blocks 321 until 335, respectively. Describing the methods by reference to a flowchart enables one skilled in the art to develop such instructions to carry out the methods within suitably configured processing units. The executable instructions may be written in a computer programming language or may be embodied in firmware logic. Furthermore, it is common in the art to speak of executable instructions as taking an action or causing a result. Such expressions are merely a shorthand way of saying that execution of the instructions causes the processing unit to perform an action or produce a result.

Figure 3A:
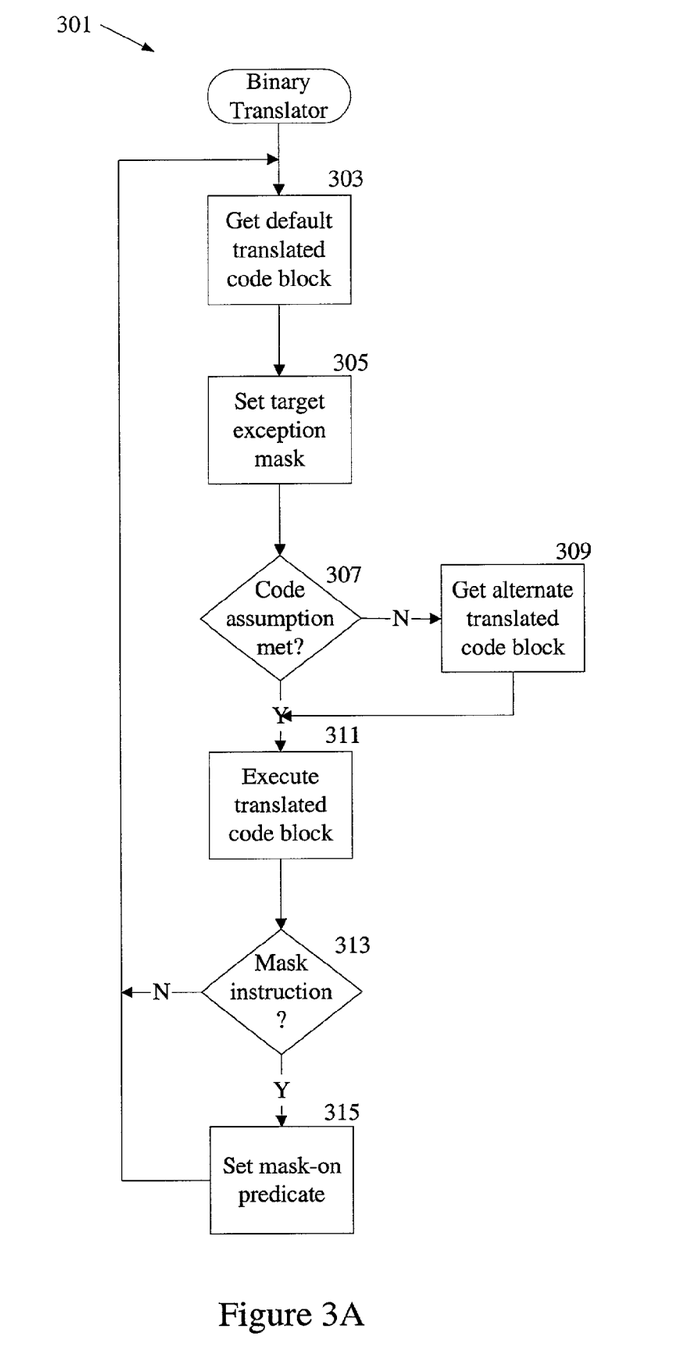
FIGS. 3A–B are flowchart of methods for performing the operations of the embodiments of the invention shown in FIGS. 1 and 2.

Referring first to FIG. 3A, the acts to be performed by a processing unit executing a binary translator method 301 that determines which of two translated code blocks to execute are described. It will be appreciated that the method 301 may be a procedure or sub-routine within a larger program that performs the functions described above for the binary translator 101.

The method 301 obtains a default translated code block for the source code to be executed (block 303) and sets the target execution mask from the source execution masks as previously described (block 305). The method 301 determines if the masking assumption of the code block is met by checking the value of the mask-on predicate 203 (block 307). If the assumption is not met, an alternate translated code block is obtained (block 309). The appropriate translated code block is executed at block 311. If a mask instruction is executed (block 313), the method 301 sets the mask-on predicate (block 315). The method 301 obtains the default translated code block for the next source code block at block 303 and repeats the process.

The default and alternate translated code blocks may be generated as needed, or generated and cached in memory for subsequent use. In one embodiment, the two code blocks are optimized and conservative code blocks, such as previously described in conjunction with FIG. 2. In yet another embodiment, the default code block is initially the conservative code block. After a threshold number of executions of the conservative code block, the optimized code block is generated and becomes the default code block. In a further embodiment, the threshold number is 600 executions.

Although the method 301 has been described in terms of two code blocks, it will be appreciated that the processing can be extended to handle more than two code blocks and the invention is thus not so limited.

Figure 3B:
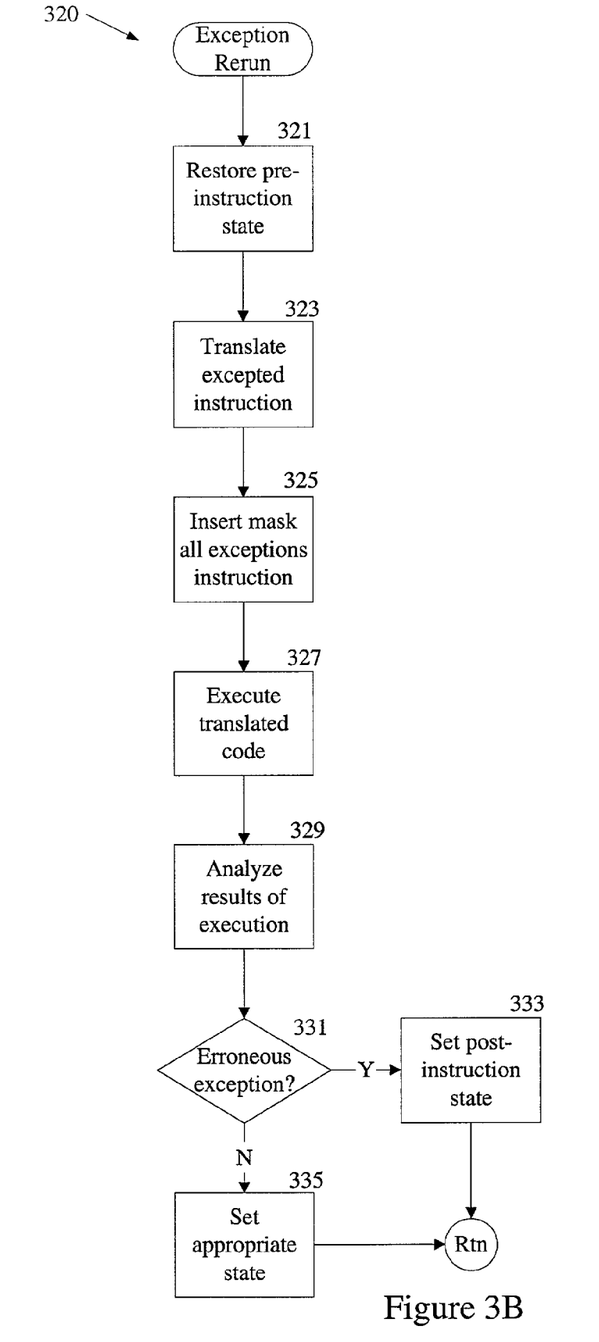

Turning now to FIG. 3B, an exception rerun method 320 is described that performs the acts described previously for the exception rerun mode when executed by a processing unit. It will be appreciated that the method 320 may be a procedure or sub-routine within the binary translator 101 or may be a procedure within an exception handler invoked when an exception is raised.

The method 320 restores the pre-instruction state (block 321) and translates the excepted instruction (block 323). An instruction that masks all the exceptions is inserted at the beginning of the translated code (block 325) and the translated code is executed (block 327). The result of the execution is analyzed at block 329, such as by examining the exception bits and the exception unmask control bits in status/control registers.

If the exception is erroneous (block 331), the state of the source architecture is set to the post-instruction state. Otherwise, the source mode and type of the exception determines which state is correct (block 335). For example, in the IA32 source architecture if the source mode is SSE, the correct state is the pre-instruction state for all genuine exceptions. If the source mode is FP and the exception is an invalid operation (IE), a denormalized operation (DE), or a zero divide (ZE), the correct state is the pre-instruction state. The other FP exceptions, overflow (OE), underflow (UE) and precision (PE), result in the post-instruction state being set as the source architecture state. In case multiple exception bits are generated in during the exception rerun mode, an exception priority defined by the source architecture may be used to decide which exception should be raised.

It will be appreciated that more or fewer processes may be incorporated into the methods illustrated in FIGS. 3A–B without departing from the scope of the invention and that no particular order is implied by the arrangement of blocks shown and described herein.

The particular handling of FP numeric exceptions is now further explained through pseudo-code examples. The following is the pseudo-code control flow for the regular execution and exception rerun modes:

```
REPEAT {
    TRY {
        Switch (the mode of translation) {
            Case "FP Exception Rerun" Mode:
            {
                1. Translate the excepted instruction specially;
                2. Execute the translated code of the excepted instruction;
                3. Analyze the result of the expected instruction to determine the
                   exception to be raised, and restore the correct state;
                4. Leave "FP Exception Rerun" mode for regular execution mode;
            }
            Case Regular execution mode:
            {
                1. Translate the instruction optimally with assumption of all
                   exceptions masked;
                2. Execute the optimized code block;
                (the control will transfer to the conservative code block translation
                and execution in case of exception are unmasked on the fly)
            }
        }
    } ON CATCHED EXCEPTIONS { // Handler code
        If ( FP Exception Occurs) {
            1. Restore the State to the pre-instruction state;
            2. Enter "FP Exception Rerun" mode;
        }
    }
}
```

-continued

The sharing of a single target exception mask by multiple target masks is illustrated in the following pseudo-code:

Input: Multiple distinct exception masks of source architecture: MASK1, MASK2, ... MASKn;
    Output: The single mask of target architecture: MASK_T;
    Algorithm:
        On change to MASK1, MASK2, ... MASKn,
            For every Exception Mask bit M,
            MASK_T.M ← MASK1.M & MASK2.M & ... & MASKn.M;

When applied to the FPCW, MXCSR and FPSR registers of Figures 4A–C, the pseudo-code might be as follows:

On Change to FPCW/MXCSR, or Execution Entry: {
        Update FPCW/MXCSR representation(s):
        FPSR.traps.ID ← FPCW.IM & MXCSR.IM;
        FPSR.traps.UD ← FPCW.UM & MXCSR.UM;
        FPSR.traps.OD ← FPCW.OM & MXCSR.OM;
        FPSR.traps.ZD ← FPCW.ZM & MXCSR.ZM;
        FPSR.traps.DD ← FPCW.DM & MXCSR.DM;
        FPSR.traps.VD ← FPCW.PM & MXCSR.PM;
    }

The processing represented by blocks 329 through 335 in Figure 3B could be represented by the following pseudo-code.

Input:
        Exception bits generated by re-running of exception instruction;
        Mask bits of the instruction being run;
        Pre-instruction state and Post-instruction state;
    Output:
        Find the unmasked exception condition.
        Restore the correct state.
    Algorithm:
        EXCEPTION ← Exception bits in the result;
        MASK ← Mask bits of the instruction being run;
        According to Exception Priority, check the bit in EXCEPTION one by one:
            being
                If (the exception bit is on, and the corresponding bit is unmasked in MASK)
                    UNMASKED-EXCEPTION ← the exception bit;
        end
        According to UNMASKED-EXCEPTION, and the rule defined in the source architecture:
            Either the pre-instruction or post-instruction are raised;
            Either the exception is raised immediately or the exception is deferred.

Figure 5:
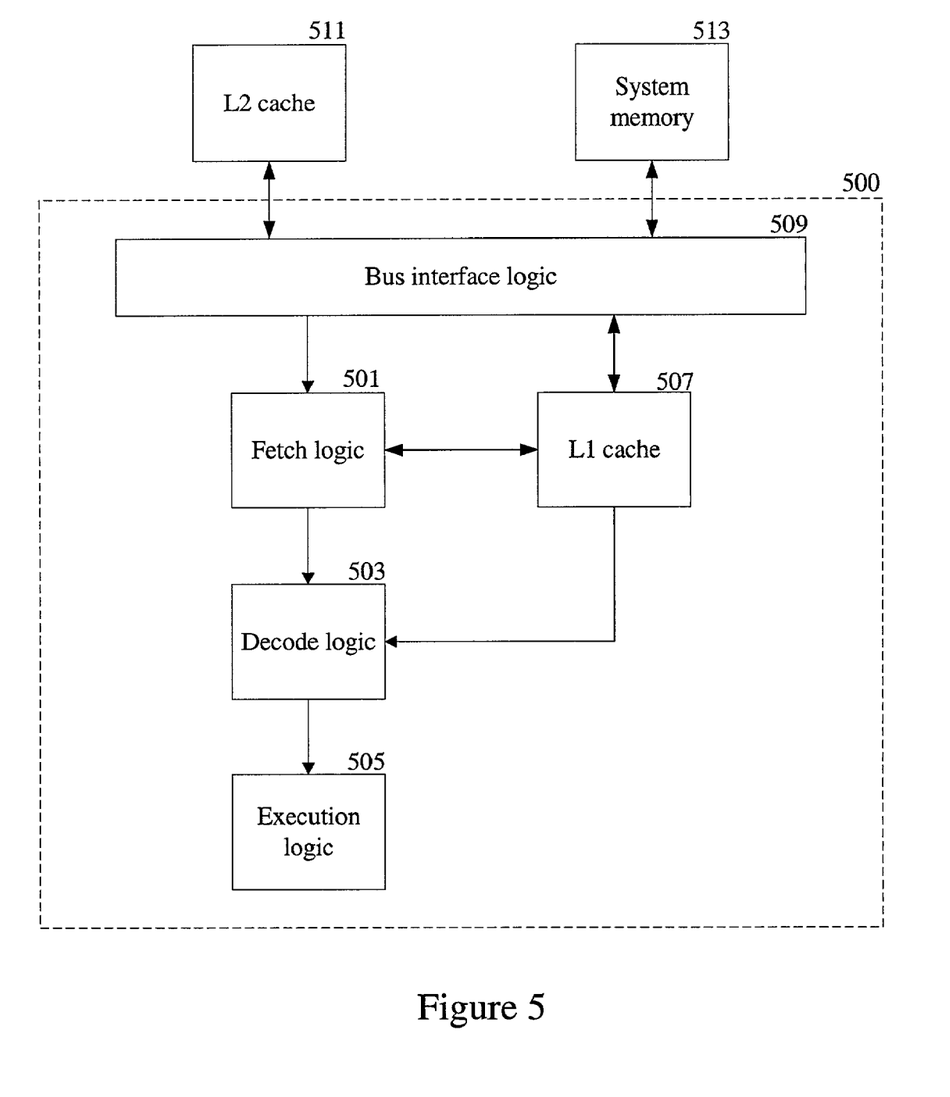
FIG. 5 is a diagram of one embodiment of processing unit in which the present invention may be practiced.
Figure 6:
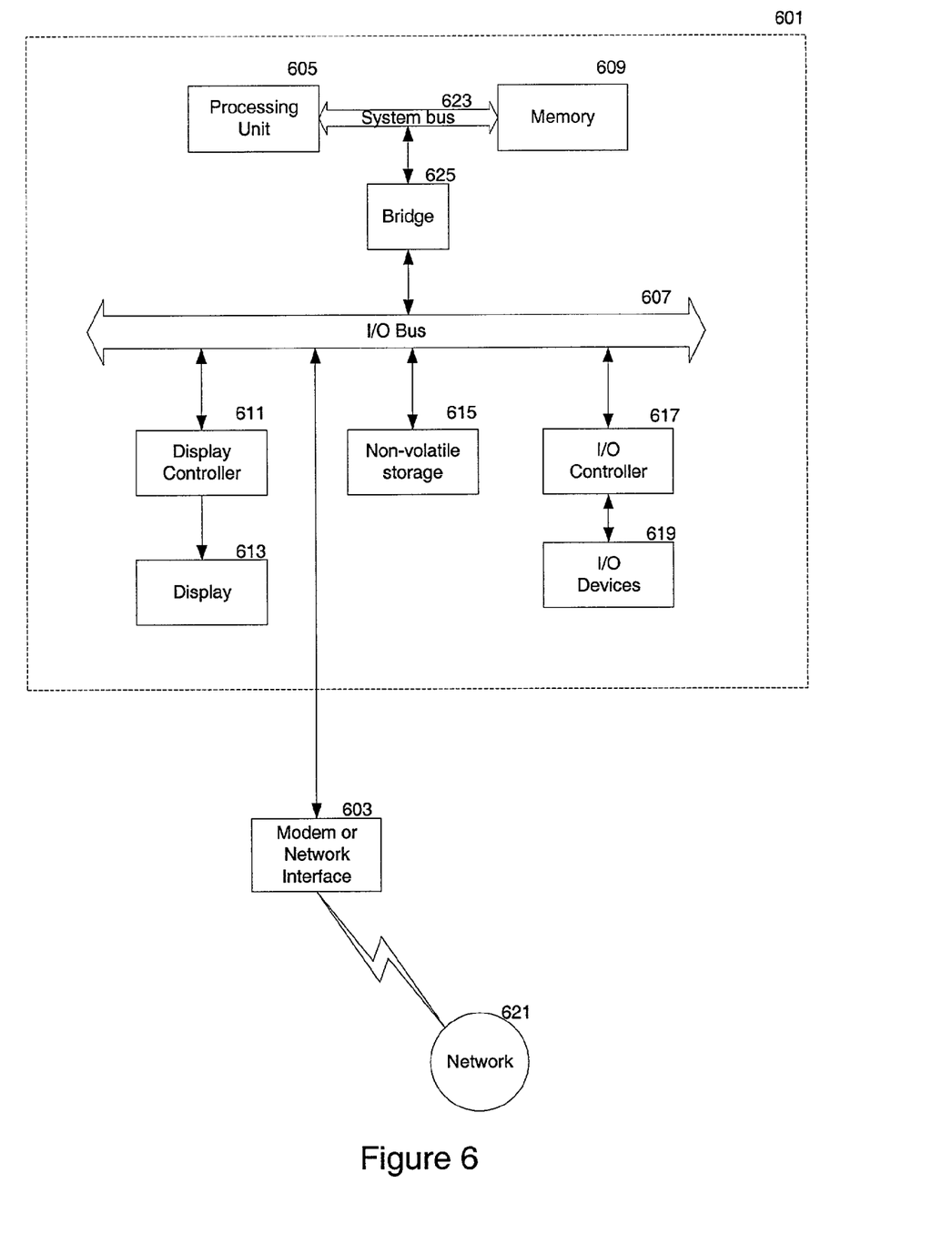
FIG. 6 is a diagram of one embodiment of a computer system in which the processing unit of FIG. 5 may incorporated.

When implemented with the FPCW, MXCSR and FPSR registers, the psuedo-code might be as follows:

Exception ← Exception bits in the result;
    If (the instruction is FP instruction)
        MASK ← Mask bits of FPCW;
    If (the instruction is SSE instruction)
        MASK ← Mask bits of MXCSR;
    If ( Exception.IE && ~Mask.IM) {
        RaisedException ← IE;
    } ELSE IF (Exception.DE && ~Mask.DM) {
        RaisedException ← DE;
    } ELSE IF (Exception.ZE && ~Mask.ZM) {
        RaisedException ← ZE;
    } ELSE IF (Exception.OE && ~Mask.OM) {
        RaisedException ← OE;
    } ELSE IF (Exception.UE && ~Mask.UM) {
        RaisedException ← UE;
    } ELSE IF (Exception.PE && ~Mask.PM) {
        RaisedException ← PE;
    }
    If (the instruction is FP instruction) {
        If(RaisedException is IE, DE or ZE) {
        Restore the pre-instruction state;
        }
        If(RaisedException is OE, UE or PE) {
        Restore the post-instruction state;
        }
    }
    If (the instruction is SSE instruction) {
        Restore the pre-instruction state;
        Raise the SSE Precision Exception Immediately;
    }
    // Erroneous FP/SSE exception goes to here
        Restore the post-instruction state;

The following descriptions of FIGS. 5 and 6 are intended to provide an overview of processing units and computer hardware in which embodiments of the invention can be implemented, but is not intended to limit the applicable environments.

FIG. 5 shows a processing unit 500 containing fetch logic 501, decode logic 503, and execution logic 505, a first level (L1) cache 507, and bus interface logic 509. If the information requested by the fetch logic 501 is not in the L1 cache 507, the L1 cache 507 requests the information from a second level (L2) cache 511 by way of the bus interface logic 509. If the information is not cached in the L2 cache 511, the L2 cache 511 in turn, requests the information from a system memory 513 via the bus interface logic 509. While the L2 cache 511 is illustrated as being external to the processing unit 500, embodiments that include the L2 cache within the processing unit 500 are conventional and encompassed within the description of FIG. 5.

When an application written for a different (source) architecture is launched in the architecture (target) of FIG. 5, a binary translator in accordance with the present invention is executed in the processing unit 500. The binary translator contains two stages: a translation stage and an execution stage. At the translation stage, the instructions of the source architecture are fetched and translated into instructions in the destination architecture in a "block by block" manner. The blocks of translated instructions are generally stored in L1 507 or L2 511 caches or the system memory 511. The binary translator enters the execution stage to process each block of the translated instructions. When the execution stage reaches instructions that have not yet been translated, the binary translator re-enters the translation stage to translate additional blocks.

FIG. 6 shows one example of a conventional computer system containing a processing unit 601, such as processing unit 500, that incorporates the invention. Memory 609 is coupled to the processing unit 605 by a system bus 623. Memory 609 can be dynamic random access memory (DRAM) and can also include static RAM (SRAM). A bridge 625 couples the system bus 623 to an input/output (I/O) bus 607, which further couples a display controller 611, non-volatile storage 615, and an I/O controller 617 to the processing unit 605. A modem or other network interface 603 may also be coupled to the I/O bus 607 to connect the computer system 601 to a network 621. The display controller 611 controls in the conventional manner a display on a display device 613 which can be a cathode ray tube (CRT) or liquid crystal display. The input/output devices 619 can include a keyboard, disk drives, printers, a scanner, and other input and output devices, including a mouse or other pointing device. The input/output devices 619 may include a digital image input device, such as a digital camera, that is coupled to the I/O controller 617 in order to allow images from the digital image input device to be input into the computer system 601. The display controller 611, the I/O controller 617, and the modem/network interface 603 can be implemented with conventional well known technology. The non-volatile storage 615 is often a magnetic hard disk, an optical disk, or another form of storage for large amounts of data. Some of this data is often written, by a direct memory access process, into memory 609 during execution of software in the computer system 601. One of skill in the art will immediately recognize that the term "computer-readable medium" includes any type of storage device that is accessible by the processing unit 605.

It will be appreciated that the computer system 601 is one example of many possible computer systems which have different architectures. A typical computer system will usually include at least a processing unit, memory, and a bus coupling the memory to the processing unit.

Exception masking for a binary translator that translates between architectures having different numbers of exception masks has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. The terminology used in this application with respect to binary translators is meant to include all programs or processes that enable code written for one computer architecture to be executed in a different architecture. Therefore, it is manifestly intended that this invention be limited only by the following claims and equivalents thereof.

What is claimed is:

1. A method comprising:
    mapping a plurality of exception masks in a source architecture to an exception mask in a target architecture;
    determining a translated code block to use as translated code based on the exception mask in the target architecture;
    executing the translated code in the target architecture, the translated code representing binary code in the source architecture; and
    determining a state for the source architecture if an exception is raised while executing the translated code.

2. The method of claim 1, wherein determining a state comprises:
    determining an excepted instruction in the source architecture corresponding to the translated code that raised the exception;
    restoring the state of the source architecture to a pre-instruction state;
    masking all exceptions in the exception mask in the target architecture;
    re-executing the translated code corresponding to the excepted instruction; and
    analyzing a result of re-executing the translated code.

3. The method of claim 2, wherein analyzing a result comprises:
    determining an exception type for the exception that was raised; and
    examining the exception mask in the source architecture associated with the excepted instruction.

4. The method of claim 1 further comprising:
    selecting the state for the source architecture based on an exception type if the exception is genuine.

5. The method of claim 1 further comprising:
    selecting a post-instruction state for the source architecture if the exception is erroneous.

6. The method of claim 1, wherein mapping a plurality of exception masks comprises:
    performing a logical AND operation on the plurality of exception masks.

7. The method of claim 1 further comprising:
    checking the exception mask against a masking assumption for the translated code block.

8. The method of claim 7 further comprising:
    generating two translated code blocks, an optimized code block with a masking assumption that all exceptions are masked and a conservative code block with a masking assumption that an exception is unmasked.

9. The method of claim 1, wherein determining a translated code block comprises:
recognizing when the exception mask in the target architecture is changed by an instruction in the source architecture.

10. A machine-readable medium providing instructions, which when executed by a processing unit, causes the processing unit to perform operations comprising:
mapping a plurality of exception masks in a source architecture to an exception mask in a target architecture;
determining a translated code block to use as translated code based on the exception mask in the target architecture;
executing the translated code in the target architecture, the translated code representing binary code in the source architecture; and
determining a state for the source architecture if an exception is raised while executing the translated code.

11. The machine-readable medium of claim 10, wherein determining a state comprises:
determining an excepted instruction in the source architecture corresponding to the translated code that raised the exception;
restoring the state of the source architecture to a pre-instruction state;
masking all exceptions in the exception mask in the target architecture;
re-executing the translated code corresponding to the excepted instruction; and
analyzing a result of re-executing the translated code.

12. The machine-readable medium of claim 11, wherein analyzing a result further comprises:
determining an exception type for the exception that was raised; and
examining the exception mask in the source architecture associated with the excepted instruction.

13. The machine-readable medium of claim 10 further comprising:
selecting the state for the source architecture based on an exception type if the exception is genuine.

14. The machine-readable medium of claim 10 further comprising:
selecting a post-instruction state for the source architecture if the exception is erroneous.

15. The machine-readable medium of claim 10, wherein mapping a plurality of exception masks comprises:
performing a logical AND operation on the plurality of exception masks.

16. The machine-readable medium of claim 10 further comprising:
checking the exception mask against a masking assumption for the translated code block.

17. The machine-readable medium of claim 16 further comprising:
generating two translated code blocks, an optimized code block with a masking assumption that all exceptions are masked and a conservative code block with a masking assumption that an exception is unmasked.

18. The machine-readable medium of claim 10, wherein determining a translated code block comprises:
recognizing when the exception mask in the target architecture is changed by an instruction in the source architecture.

19. An apparatus comprising:
a processing unit coupled to a memory through a bus; and
a binary translation process executed from the memory by the processing unit to cause the processing unit to map a plurality of exception masks in a source architecture to an exception mask associated with the processing unit, determine a translated code block to use as translated code based on the exception mask in the target architecture; execute the translated code representing binary code in the source architecture, and determine a state for the source architecture if an exception is raised while executing the translated code.

20. The apparatus of claim 19, wherein the binary translation process further causes the processing unit to determine an excepted instruction in the source architecture corresponding to the translated code that raised the exception, restore the state of the source architecture to a pre-instruction state, mask all exceptions in the exception mask associated with the processing unit, re-execute the translated code corresponding to the excepted instruction, and analyze a result of re-executing the translated code to determine a state for the source architecture.

21. The apparatus of claim 20, wherein the binary translation process further causes the processing unit to determine an exception type for the exception that was raised, and examine the exception mask in the source architecture associated with the excepted instruction to analyze a result.

22. The apparatus of claim 19, wherein the binary translation process further causes the processing unit to select the state for the source architecture based on an exception type if the exception is genuine.

23. The apparatus of claim 19, wherein the binary translation process further causes the processing unit to select a post-instruction state for the source architecture if the exception is erroneous.

24. The apparatus of claim 19, wherein the binary translation process further causes the processing unit to perform a logical AND operation on the plurality of exception masks to map the plurality of exception masks to the exception mask associated with the processing unit.

25. The apparatus of claim 19, wherein the binary translation process further causes the processing unit to check the exception mask against a masking assumption for the translated code block.

26. The apparatus of claim 25, wherein the binary translation process further causes the processing unit to generate two translated code blocks, an optimized code block with a masking assumption that all exceptions are masked and a conservative code block with a masking assumption that an exception is unmasked.

27. The apparatus of claim 19, wherein the binary translation process further causes the processing unit to recognize when the exception mask associated with the processing unit is changed by an instruction in the source architecture to determine the translated code block.

* * * * *

UNITED STATES PATENT AND TRADEMARK OFFICE
CERTIFICATE OF CORRECTION

PATENT NO. : 7,000,226 B2
APPLICATION NO. : 10/038139
DATED : February 14, 2006
INVENTOR(S) : Gao It is certified that error appears in the above-identified patent and that said Letters Patent is hereby corrected as shown below:

In column 4, at line 45, delete "FUDCW" and insert --FLDCW--.
In column 4, at line 57, delete "incorporated" and insert --incorporate--.
In column 9, at line 65, after "605" insert --and also encompasses a carrier wave that encodes a data signal--.

Signed and Sealed this

Sixth Day of November, 2007

JON W. DUDAS
*Director of the United States Patent and Trademark Office*